Patented Nov. 26, 1935

2,022,467

UNITED STATES PATENT OFFICE 2,022,467

PROCESS OF MAKING SOLUBLE COFFEE AND PRODUCT

Wilbert A. Heyman, New York, N. Y.

No Drawing. Application January 8, 1935, Serial No. 842

2 Claims. (Cl. 99—11)

This invention relates to beverages and one of the objects thereof is to prepare a soluble coffee in granular form together with freshly roasted and ground coffee granules of about the same size, both of which are larger in size than the openings of the porous containers or bags in which they are to be packed or used and from which the soluble coffee is to be extracted with water. This mixture of soluble substance capable of immediately dissolving and thereby giving the water its full requirements of soluble solids necessary to make a typical cup of coffee, together with the partially soluble substance capable of giving to the fluid its characteristic flavor and aroma instantly, both of which products are in a granular form of a larger size than the openings of the porous container which is used for conveying and/or dispensing and extracting in the fluid, is new so far as I know.

Another object of the invention is to prepare a quickly soluble food beverage such as coffee, in granular form and having the characteristic flavor and aroma of the original product from which it was prepared, such product being packed in suitable porous containers having a mesh or openings smaller than the said granules to prevent their shifting out.

Another object of the invention is to prepare a mixture of food beverage granules such as coffee, one part of said mixture being completely and substantially instantly soluble, and the other part being only partly soluble, but having its original flavor and aroma unimpaired, both granules of which are of a size larger than the holes in the porous container or bags from which the soluble substance, aroma and flavor is to be extracted.

I accomplish these results in the manner hereinafter described and claimed, it being understood that changes in the method, and products may be made within the scope of the claims, and as indicated by the variations in the different claims without departing from the spirit of the invention.

My invention therefore consists in the several steps of the process hereinafter described and the relation of each step to the others thereof.

When coffee beverage is prepared in the customary manner it requires considerable time to extract sufficient soluble substance to impart sufficient body to make the beverage palatable; however the characteristic aroma and flavor is instantly apparent as soon as hot water comes in contact with the ground roasted coffee. The reason for this is because during the roasting process the heat of roasting develops the flavor and aroma of the "caffeol". At the same time carbon-dioxide gas as well as a portion of carbon monoxide gas is formed and remains locked within the cells of the coffee. On coming in contact with the hot water these gases expand and force their way out of the cells, bringing with them the volatile flavors and aromas which are likewise quite volatile. Until the gases have been driven out of the cells of the coffee the water cannot penetrate within in order to dissolve the soluble substance. Freshly roasted ground coffee will first float when placed in hot water and later sink to the bottom of the glass when the gases have been driven out. It is the protection which these gases afford to the delicate flavors and aromas locked within the cells which prevents them coming in contact with the oxygen of the air and becoming stale or rancid. In time these gases will diffuse out and oxygen will diffuse within the cells and the coffee will become unfit for use. Coffee packed in vacuum which draws this protective gas out of the cells will become stale much quicker when the vacuum is released and air and oxygen rushes in to attack the delicate flavor, than coffee packed in a manner which does not expose the caffeol to the oxygen. However while it remains under the vacuum the coffee will remain substantially unaltered.

The amount of soluble solids usually required to make a typical cup of coffee ranges within very narrow limits, i. e. between six one hundredths (.06 oz.) and eight one hundredths (.08 oz.) of an ounce when dissolved in six ounces of hot water. These quantities correspond to about 25 and 35 grains respectively of soluble coffee substance. Inasmuch as the soluble extractive substance in freshly roasted coffee ranges from fifteen to twenty percent, this amount of soluble substance would require the use of between one hundred and seventy-five (175) to two hundred and thirty-one (231) grains of freshly roasted and ground coffee to make one cup. Depending upon the manner in which coffee is usually prepared the yield is usually about forty (40) cups to the pound or one hundred and seventy-five (175) grains to prepare a cup. I have found however that it requires only one hundred (100) grains of freshly roasted and ground coffee to produce a typical cup of coffee together with twenty-five grains (25) of dry soluble extract of coffee. These quantities dissolved in sufficient water to yield six ounces of finished coffee will produce a typical cup of coffee instantly, said beverage having the flavor and aroma of a beverage made wholly from the same quality of freshly roasted ground coffee.

Tea is a well known article of commerce dating back to ancient times. Unlike coffee the soluble substance in tea diffuses almost immediately when immersed in a cup of hot water. This has made it possible to develop the industry of packing and marketing tea in tea bags or tea balls for immediate consumption when desired by merely placing them in a cup of hot water. This industry has gained tremendous proportions and importance. The same results until the present invention have never been possible with coffee, to the best of my knowledge, because the soluble coffee substance is locked within the cells of the ground coffee and in order for the water to dissolve this substance by osmosis the gases must first be driven out so that the water may come in contact with the porous and semiporous cell walls.

There have been many patents issued upon soluble dry coffee extract claimed to be as good as coffee made freshly from the ground roasted coffee, but so far as I know there has never been one which was as good or which would prepare a cup of coffee as fine in flavor as fresh coffee. Those I have seen on the market lack the indescribably but delightful nutty flavor by which coffee tasters and coffee experts as well as coffee drinkers identify good coffee. More than one billion, five hundred million (1,500,000,000 lbs.) pounds of green coffee were sold in the United States during the year 1932, but the sale of soluble coffee was very insignificant in comparison to this tremendous amount. The reason for this is quite apparent. Therefore any process which would result in making a typical cup of coffee quickly which was substantially free of insoluble grounds, yet possessing the delightful natural aroma and flavor and body of freshly brewed coffee made from freshly roasted and ground coffee would be of great economic value.

When coffee is extracted with hot water and the liquid extract is allowed to remain too long in contact with the insoluble grounds an undesirable bitter flavor develops. This is no doubt due to a catalytic action exerted by the grounds causing the "caffeol" to become oxidized. It may also be due to the solubility of a bitter principle which is difficult of solution requiring long time, however if the water is removed often in the extractive process very much less quantities develop. I have also found that if I extract the coffee in the absence of the air and in the presence of an inert gas that much less of this bitter principle is formed. It is well known that delicate flavors and aromas can be preserved by protecting them from the action of oxygen, as this was clearly pointed out in my Patent No. 1,527,304, Process for liquid treatment. A process for concentrating liquids such as coffee, by freezing in the absence of air and in the presence of inert gas is clearly pointed out in Patent No. 1,641,429, Continuous freezing machine. The process for drying the concentrated liquid coffee extract is well known, but in the process of removing the water, the volatile substances which have a lower boiling point or an equal boiling point with water are removed in the process, and so far as I know through long research and experiment it is impossible to recover them and replace them to exactly simulate a typical cup of fresh coffee.

The coffee berry is the fruit of the plant Coffea arabica, Coffea liberica and Coffea robusta. Beneath the skin of the berry of coffee in the "cherry" is a mucilaginous substance enveloping the parchment covering which encloses the green coffee beans. This substance contains sugars. I have also found that the beans themselves also contain sugar. During the fermenting and curing process this sugar forms alcohol and later acetic acid and other volatile acids. Various coffee beans contain varying amounts of these volatile acids depending on the sugar content and the drying and roasting process. These volatile acids come over in the drying process and are caught with the water in the condenser. These acids are one of the many characteristics of a typical cup of coffee. Some of the other typical chemical constituents of coffee are caffeine, caffetanic acid, and "caffeol". "Caffeol" is the term ordinarily given for the complex and unknown multitudinous substances which are formed in the roasting process. These complex bodies are no doubt of varying boiling points, but each bears a distinct relation to the other in producing the taste and aroma blends, and when any changes occur as are bound to occur in removing them it is absolutely impossible to catch them and replace them in the same order in which they originally occurred in the freshly ground and roasted coffee. During the roasting process some of the organic substance of the beans is transformed into carbon-dioxide and some is transformed into carbon monoxide. Due to incomplete oxidation a form of destructive distillation takes place, forming unsaturated bodies. These unsaturated bodies are locked within the cells guarded by the gases which exist in varying degrees of pressure. On losing this protective gas the unsaturated bodies oxidize on coming in contact with air. I have found that I can preserve the flavor of freshly ground coffee for much longer periods of time by removing the surrounding atmosphere of oxygen and placing the freshly roasted and ground or unground coffee under a pressure of inert gas to prevent the loss of the gases within the cells. I prefer to use carbon-dioxide at about forty pounds pressure as being about the same type and pressure of gas within the cells.

The commercial value of coffee is determined by the amount and character of the flavoring and odoriferous substances formed from the beans, during the roasting process.

In a preferred operation of my process I first secure the particular beans or blend of beans which I desire and subject them to a "medium" roast. I then grind a portion of them to a "fine" grind, retaining some of the unground roasted beans to be ground to the size necessary for later mixing with the dry granular soluble extract.

I then extract the soluble substance from the finely ground roasted coffee in the usual manner or in accordance with my patented process hereinbefore mentioned and at a temperature below 180° F. I use sufficient water and sufficient time to secure the greatest yield. However, I keep the first portion of the extract separate from the latter portions inasmuch as that portion which is removed during the first twelve hours of extraction has a milder and more bland flavor and less bitterness than the last portion, and when this first portion is processed in the manner herein described and it is mixed with the freshly roasted and ground coffee and said mixture is extracted with hot water to prepare a cup of typical coffee it permits the delicate aroma and flavor to come through more naturally. I use the second portion for making soluble coffee extract in a dry form for use in candy making, ice cream, desserts and other purposes wherein a stronger coffee flavor is required.

After the coffee is extracted and separated from the grounds, I treat it in accordance with my Process for liquid treatment, Patent No. 1,527,304 and filter it out of contact with oxygen and in the presence of an inert gas. This extract usually has a density of between ten (10) and twenty (20) percent. Although I could concentrate this extract by the usual diffusion-battery osmotic process so widely used in beet sugar factories I prefer to use either ordinary vacuum pans or the freezing process as described in my Patent No. 1,641,429, because these means require less equipment and space, though more water must be removed. I then concentrate this thin liquid extract to between sixty (60) and seventy (70) percent solids at a low temperature as described. I then transfer this concentrated liquid coffee extract to the pans of a vacuum shelf drier, being careful during the entire process that the liquid does not come in contact with iron. I preferably use glass or enameled pans. I then complete the drying process under a vacuum of twenty nine inches or more. The high vacuum causes the removal of the water, volatile acids, and other volatile substances and the solids crystallize into friable blisters and conglomerates of crystals which are easily removed from the pans. I have discovered that these crystals are anhydrous and will take up water of crystallization.

I then pass this mass of friable crystals through woven wire screens of the particular size desired, depending upon the size of the openings in the porous container or cloth from which I make the bags or containers in which to pack the finished product or from which I wish to extract the soluble substance, flavors and aromatic substances by the use of hot water. In practice I use a wire screen having a mesh of about twenty holes to the lineal inch and with wire of 24 gauge, since this is the best size to simulate ground roasted coffee.

I then sift out all dust which may have been formed in the process of scraping the granular particles from the pans. Inasmuch as the cheese cloth which I preferably use to pack the finished product in, has holes or openings corresponding to forty per lineal inch, I sift the entire mass through wire screens having thirty-eight holes per lineal inch and having wire of about the same gauge as the thread of the cheese cloth. I then mix this soluble dry coffee extract which has been so graded to granular particle form, with that portion of the roasted beans which I set aside previously, first having ground and graded the granular particles in the same manner now being described for the soluble granules. This will result in a uniform mixture which can be accurately measured or weighed by automatic packaging machinery such as is ordinarily used in commerce for weighing and packing tea balls. Although I have specified cheese cloth, it is quite evident that other porous cloth or porous metal or other porous containers could be used. Aluminum tea balls and other strainers which are perforated are a well known commodity.

When this mixture is packed into the containers the soluble granular particles are separated and dispersed by the partially soluble freshly roasted and ground coffee. Should these soluble granular particles come in contact with a humid atmosphere so that they would absorb moisture, they could not lump and become unusable as is the case with the soluble coffee now on the market and packed in cans or glass. Furthermore due to this dispersion, on being placed in hot water they quickly dissolve due to the fact that the water easily reaches every granular particle, which is also not the case with finely ground coffee extract, as the latter balls up and prevents the contact with the water necessary to effect solution.

Inasmuch as a typical cup of coffee requires about twenty-five grains of soluble coffee solids to make it palatable, I preferably mix the soluble granules with freshly roasted and ground coffee in the proportion of twenty-five parts of soluble dry granules to one hundred parts of freshly roasted and ground coffee having about the same particle size. I then measure or weigh off about one hundred and twenty-five grains (125) of this mixture into each individual cheese cloth bag or other porous container so that on being immersed in hot water the twenty-five grains of soluble coffee solids will dissolve instantly and the additional amount of roasted and ground coffee will give off sufficient characteristic aroma and flavor to impart that nutty freshness of freshly roasted, ground and brewed coffee. I may also, if desired, pack larger bags for use in urns or other coffee extracting apparatus, but I mix it in the same proportion or substantially the same proportion and weigh off the amounts depending upon the number of cups required to be made. After the soluble solids are dissolved and the flavor and aroma is imparted to the cup of coffee the coffee remaining in the bag will still be of good quality and permit the preparation of another quantity of coffee by simply adding additional hot water and allowing it to stand a shorter time than if it had not already been deprived of its gases by immersion in the first hot water. This enables the preparation of a quick cup of coffee, and while this is being drunk a second portion of coffee may be prepared, thereby preventing any waste.

After the bags or other containers are accurately measured and prepared I then place them in cans or glass containers capable of being hermetically sealed and substitute an inert gas such as carbon-dioxide for the air contained therein and then subject the jars or containers to a pressure of the said inert gas and seal them under the said pressure. The coffee in the containers will then remain fresh indefinitely and remain fresh longer after the containers are opened than they would if the pressure of inert gas was not placed therein, or the cans or containers were sealed under vacuum alone.

In the specification and claims I use the term "granular particles" to define the units of soluble coffee as well as of the freshly roasted ground coffee which are associated within the porous container. This term is used to distinguish my soluble coffee from the finely ground or powdered soluble coffee now on the market and which has been on the market for several years. My granular particles are sizeable units, so that when they are mixed and confined in the porous container, interstices are formed between them so that water will quickly find its way between them, dissolving out the soluble part and extracting enough of the partly soluble part to give the beverage the flavor of coffee prepared wholly from freshly roasted ground coffee.

Finely ground or powdered soluble coffee would not gain the objects I achieve by my process and product because, if you use freshly roasted ground coffee, the minute units of the powder fill the interstices between the granular particles of freshly roasted ground coffee and thereby prevent the free flow of water between the adjacent granular particles of roasted ground coffee within the porous container, necessary to produce a cup of coffee before the water cools to such a degree as to make the beverage unsuitable or unpalatable as regards its temperature. In other words, the water cools before the desired infusion is produced in the cup. Most consumers of coffee as a beverage prefer to drink hot coffee, and I have found that by providing both the partially soluble coffee and soluble coffee in granular particle form as described herein, this object is attained.

It will accordingly be seen that I have provided a new and improved process, well adapted to produce my new and improved product in a very simple and inexpensive manner. My product, if utilized in the manner hereinbefore described, will produce a cup of coffee which possesses all of the flavor and aroma of freshly ground roasted coffee.

As many changes could be made in the above process and many apparently widely different embodiments of this invention could be made without departing from the scope thereof, it is intended that all matters contained in the above description shall be interpreted as illustrative and not in a limiting sense.

Having thus described my invention, what I claim is new and desire to secure by Letters Patent:

1. As a new article of manufacture, a closed, porous container having therein a quantity of partly soluble coffee in granular particle form, mixed with a quantity of soluble coffee in granular particle form, the granular particles of both the partly soluble and the soluble coffee being larger than the pores of the container, said product containing no powdered coffee.

2. The herein described process of producing a coffee product possessing the flavor and aroma of freshly roasted ground coffee, which consists in providing a quantity of comminuted dry coffee extract, screening said comminuted product to separate any powdered coffee extract which may be present therein, and to reduce said extract to granular particle form, producing a quantity of freshly roasted ground coffee, screening the latter to remove powdered constituents thereof so as to leave the freshly roasted ground coffee in granular particle form, mixing said coffee extract in granular particle form with the freshly roasted ground coffee in granular particle form, and then enclosing a suitable quantity of said mixture in a closed porous container, the granular particles of both the partly soluble and the soluble coffee being larger than the pores of the container.

WILBERT A. HEYMAN.